United States Patent [19]

Bösch

[11] Patent Number: 5,035,304

[45] Date of Patent: Jul. 30, 1991

[54] DISK BRAKE FOR VEHICLE WHEEL

[75] Inventor: Karl Bösch, Hutzmannweg 14, 4202 Duggingen, Switzerland

[73] Assignees: Karl Bösch; André Bösch

[21] Appl. No.: 425,809

[22] Filed: Oct. 23, 1989

[30] Foreign Application Priority Data

Oct. 25, 1988 [CH] Switzerland .................. 3975/88

[51] Int. Cl.$^5$ ............................................. F16D 55/22
[52] U.S. Cl. ................................. 188/71.1; 188/73.31; 188/218 A
[58] Field of Search ............... 188/218 A, 71.1, 73.31, 188/382; 51/270

[56] References Cited

U.S. PATENT DOCUMENTS

| | | | |
|---|---|---|---|
| 1,007,272 | 10/1911 | Crease | 51/270 |
| 1,393,892 | 10/1921 | Luden | 51/270 |
| 2,371,937 | 3/1945 | Weeks et al. | 188/382 X |
| 2,746,577 | 5/1956 | Butler | 188/218 A X |
| 4,373,300 | 2/1983 | Partridge | 51/270 |
| 4,555,874 | 12/1985 | Chung | 51/270 |

FOREIGN PATENT DOCUMENTS

| | | | |
|---|---|---|---|
| 2833163 | 2/1980 | Fed. Rep. of Germany | 188/71.1 |
| 62922 | 3/1988 | Japan | 188/73.31 |
| 759301 | 8/1980 | U.S.S.R. | 51/270 |

Primary Examiner—George E. A. Halvosa
Attorney, Agent, or Firm—Toren, McGeady & Associates

[57] ABSTRACT

Abraded dust arising during operation of a disc brake and having the effect of contaminating the environment may be collected and stored in a container of the disc brake according to the invention. This container should be large enough to enable it to accumulate as much abraded dust as is generated in the course of the lifetime of a pair of brake shoes. The container preferably includes a housing embracing one part of the brake disc, and a filter disposed between the housing and the brake disc. The filter is constructed of several layers of the same type or of different types and includes an arrangement adapted to guidedly introduce into the filter the air stream carrying the dust abraded off the brake components during the operation of the brake. In a filter made of two layers, these layers may be held to advantage fastened in their place by a flow guide grating or lattice adapted to guide the air stream with abraded dust in its flow into the filter.

7 Claims, 1 Drawing Sheet

U.S. Patent
July 30, 1991
5,035,304
Fig. 1
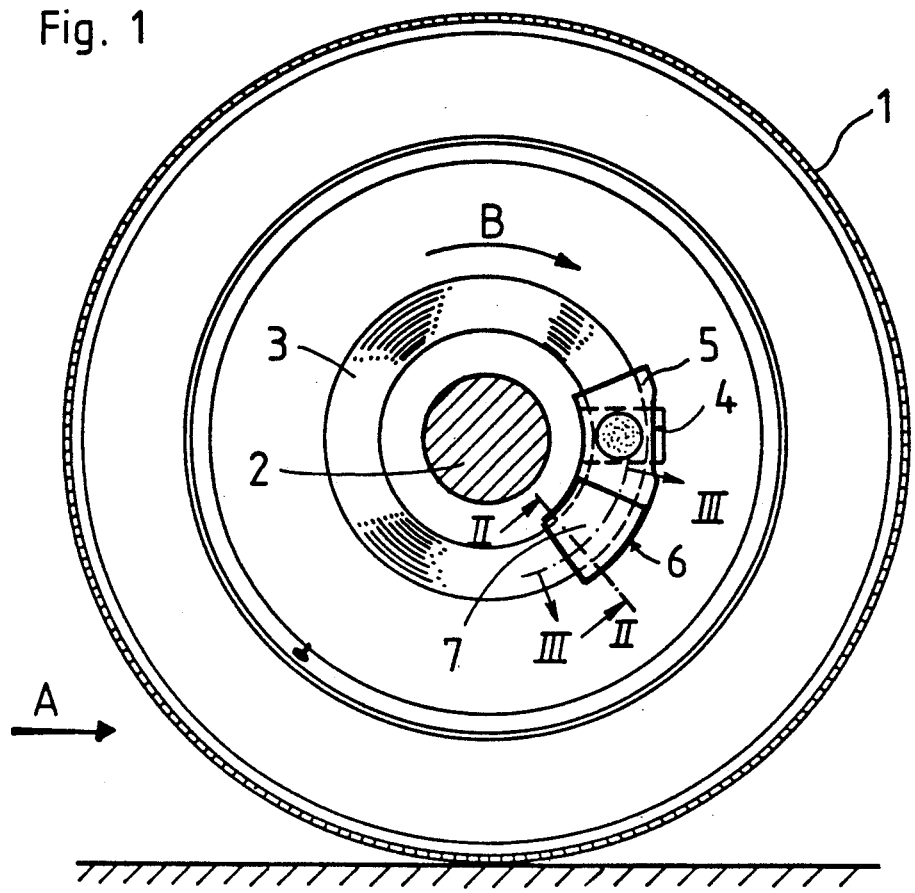
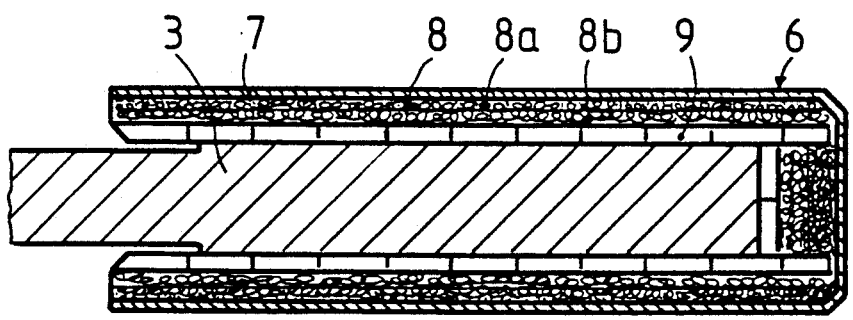
Fig. 2
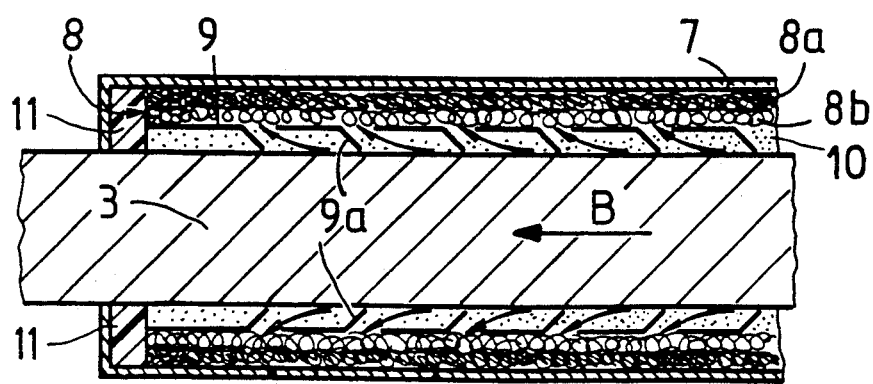
Fig. 3

DISK BRAKE FOR VEHICLE WHEEL

BACKGROUND OF THE INVENTION

1. Field of the Invention

The present invention refers to a disc brake for a vehicle wheel, the brake comprising a brake disc and brake shoes adapted to be brought into frictional engagement with the brake disc. The friction developed in such a brake between brake disc and brake shoes varies with the braking pressure applied and results in gradually reducing the rotational speed of the wheel and bringing the vehicle to a stop.

2. Description of the Prior Art

Brakes are standard equipment for motor-powered vehicles and are of prime importance for safe driving. Vehicles of former years were equipped with drum-type brakes, modern vehicles, on the other hand, are equipped with disc brakes, particularly if the braking power requirements are significant. Disc brakes can help generate higher braking power levels than drum-type brakes, because the parts rubbing against each other in disc brakes or, more specifically, the brake discs themselves are air-cooled. However, disc brakes possess the significant disadvantage of contributing to contaminating the environment. As a matter of fact, metal particles are rubbed off or abraded in the main from the brake shoes, but to some extent from the brake disc, and are blown off by the cooling air into the atmosphere, thus adding to environmental contamination. Considering the fact, that 4 to 8 brake shoes are used up per year and per vehicle, and that Switzerland has three million vehicles in use, one comes up with more than 819 metric tons of abraded metallic material per year for Switzerland alone. In addition there is a corresponding quantity of abraded adhesive material, which together with the stated abraded metallic material ends up getting in one way or another into cultured ground. The corresponding figures in the Federal Republic of Germany are 8500 metric tons of abraded dust, in Europe about 38,000 and in the whole world about 120,000 metric tons. Evidently, part of this abraded dust will first stay in the air for a shorter or longer time duration, and act as a toxic agent for the respiratory tract of both man and animal.

SUMMARY OF THE INVENTION

Hence from what has been explained heretofore it should be apparent that the art is still in need of a disc brake for a vehicle wheel, not associated with the aforementioned drawbacks and limitations of the state-of-the-art proposals.

It is therefore a primary object of the present invention to provide a novel disc brake for a vehicle wheel, which fails to be associated with the disadvantages of the prior art as heretofore discussed and which effectively and reliably fulfills an existing need in the art.

Another and more specific object of the invention relates to a new disc brake for a vehicle wheel, the disc brake having provisions made to prevent substantial quantities of particles, metallic and adhesive, abraded off the brake shoes and brake disc, from being blown by the cooling air into the atmosphere, to thus drastically reduce the contamination of the environment by such abraded dust.

Yet another object of the invention relates to a new disc brake for a vehicle wheel, whereby the dust abraded off the brake shoes and the brake disc is collected, stored, and later safely disposed of, to thus eliminate or substantially reduce the toxic stimulation which such dust, when reaching the atmosphere or cultured ground would exert on the body of man and animal.

The foregoing and other objects are attained in accordance with one aspect of the invention, by equipping the disc brake, comprising a brake disc and brake shoes, with at least one container adapted to accumulate and store the dust abraded off brake shoes and brake disc, the container being disposed adjacent to and with no interspace from the side of the brake shoe bracket at which, in the forward travelling vehicle, the brake disc leaves the region of the brake shoes.

Through proper design and dimensioning the stated container may be enabled to store the abraded dust until replacement of the brake shoes becomes necessary. In the course of such replacement the container may be emptied and the dust disposed of by a method adapted to the specific materials at hand, either by storing it in a specific refuse depot or, even better, by refining it for further use.

The brake disc according to the invention displays uncontested advantages from the ecological point of view and the point of view of human health. The environment is overloaded with gases of combustion and metallic solids. The level of such impurities has reached saturation in many regions of the world. Metallic dusts exert their toxic effects upon the human body through various channels, through the air we inhale and the food we eat. The disc brake according to the invention offers an ingenious and effective method to substantially reduce such toxic load and to relieve air and food of this hazardous product of motorized vehicles.

BRIEF DESCRIPTION OF THE DRAWING

An embodiment of the invention is described in the following, making reference to the appended drawings. In the drawing there show:

FIG. 1 a side view of a wheel equipped with a disc brake,

FIG. 2 a section viewed perpendicular to the line II—II of FIG. 1, at a larger scale, and FIG. 3 a section viewed perpendicular to the line III—III of FIG. 1, at a still larger scale.

DETAILED DESCRIPTION OF THE PREFERRED EMBODIMENTS

The wheel 1 shown in FIG. 1 and assumed to move in the direction indicated by the arrow A, i.e. rotate in the direction indicated by arrow B, is rigidly connected with the shaft 2 supported in the chassis of a vehicle, in a manner to make it either freely rotatable or positively driven. The brake disc 3 is equally connected with the shaft 2 and thus with the wheel 1, in a manner to transmit torque. The disc brake comprises, in addition to the disc 3, two brake shoes or brake blocks 4 mounted inside a brake shoe bracket or brake clamp 5, enabling them to move to and from each other, perpendicular to the plane of the disc, as brake shoes generally move, making any additional description unnecessary. Novel and inventional is, on the other hand, the provision of a container for collecting or storing particles or dust abraded as a result of the friction developed between brake discs and brake shoes when operating the brake, such dust consisting primarily of material abraded off the brake shoes, but including some material abraded off the brake discs. As particularly well visible in FIGS. 2 and 3 the stated container is made up of a housing 7 enveloping or embracing a section of the brake disc 3, and of a filter 8 disposed within the space provided between the housing 7 and the sections of the two surfaces of the brake disc 3 overlapped by the housing 7. The housing, which may be fixedly mounted either on the brake shoe bracket or brake clamp 5, or on other stationary parts of the vehicle, may consist of metal or plastic.

The filter itself, which is made of heat resistant material may be designed in one of several different ways. In the embodiment illustrated the filter consists for example of two different filter layers. One of these is a rather firm or compact layer 8a, adapted to retain at least 90% of all of the abraded particles. The second is a somewhat loose or spongy layer 8b disposed in the path of air flow in front of the layer 8a. These two layers 8a and 8b are held fastened in their place by a flow guide lattice 9 or grating which, as is visible in the drawing, is constructed with vanes 9a to make it effective to guide the air entrained by the brake disc, together with the abraded particles it carries, into the filter. As an alternative, the filter may be built of more than two layer and have for example the filtering holes made to become gradually smaller toward the housing 7. This kind of filter enables the abraded dust, which comprises grains of various sizes, to be deposited particularly well. The filter, or more particularly its thickness, is to be so dimensioned to enable it to accumulate as much abraded dust as is produced by one pair of brake shoes in the course of its entire life. Care must be taken, to keep the surface of the brake disc 3 overlapped by the filter 8 preferably small, so that the cooling effect resulting from the rotation of the brake disc 3 will not be impeded or undone. As shown in FIG. 3, the housing 7 can also be provided with sealing lips 11 which keep water from entering the filter.

While there are shown and described present preferred embodiments of the invention, it is to be distinctly understood, that the invention is not limited thereto but may be otherwise variously embodied and practiced within the scope of the appended claims.

What is claimed is:

1. Disc brake for vehicle wheel comprising a brake disc, brake shoes, and a brake shoe bracket in which the brake shoes are supported, wherein at least one container adapted to accumulate and store dust abraded from the brake shoes and brake disc is provided, the container including a housing which embraces a section of the brake disc and a filter disposed between the housing and the sections of both brake disc surfaces overlapped by the housing, the filter being adapted to take up the abraded dust, the container being disposed adjacent to and with no interspace from a side of the brake shoe bracket at which, in the forward travelling vehicle, the brake disc leaves the region of the brake shoes.

2. Disc brake as claimed in claim 1, wherein the housing is provided with sealing lips adapted to prevent water from entering the filter.

3. Disc brake as claimed in claim 1 or 2, wherein on its sides facing the brake disc the filter comprises guide elements adapted to guide the abraded dust into the inside of the filter.

4. Disc brake as claimed in claim 3, wherein the filter is so constructed of individual layers that the layer disposed adjacent the brake disc permits the abraded dust to enter with turbulence, whereas the layer disposed adjacent the housing is effective to retain the abraded dust.

5. Disc brake as claimed in claim 4, comprising a filter made of two layers, wherein the two layers are held fastened in their place by a flow guide grating or lattice adapted to guide the air entrained by the brake disc together with the abraded dust it carries, into the filter.

6. Disc brake as claimed in claim 1 or 2, wherein the filter is so constructed of individual layers that the layer disposed adjacent the brake disc permits the abraded dust to enter with turbulence, whereas the layer disposed adjacent the housing is effective to retain the abraded dust.

7. Disc brake as claimed in claim 6 comprising a filter made of two layers, wherein the two layers are held fastened in their place by a flow guide grating or lattice adapted to guide the air entrained by the brake disc together with the abraded dust it carries, into the filter.

* * * * *

UNITED STATES PATENT AND TRADEMARK OFFICE
CERTIFICATE OF CORRECTION

PATENT NO. : 5,035,304
DATED : July 30, 1991
INVENTOR(S) : Karl Bösch

It is certified that error appears in the above-identified patent and that said Letters Patent is hereby corrected as shown below:

Title page item [54], and col. 1, line 1, should read --DISC BRAKE FOR

VEHICLE WHEEL--.

Title page, item [73] Assignees: should read --Karl Bosch; Andre Bosch; both of

Duggingen, Switzerland--.

Signed and Sealed this

Eleventh Day of May, 1993

Attest:

MICHAEL K. KIRK

Attesting Officer

Acting Commissioner of Patents and Trademarks